United States Patent [19]

Hirata et al.

[11] Patent Number: 5,782,189
[45] Date of Patent: Jul. 21, 1998

[54] SEWING MACHINE WITH DISPLAY FOR SELECTING SEWING PATTERNS

[75] Inventors: Takashi Hirata; Shintaro Tomita, both of Nagoya; Ryoji Owaki, Kasugai, all of Japan

[73] Assignee: Brother Kogyo Kabushiki Kaisha, Nagoya, Japan

[21] Appl. No.: 804,110

[22] Filed: Feb. 20, 1997

[30]  Foreign Application Priority Data

| Feb. 23, 1996 | [JP] | Japan | 8-035895 |
| Feb. 29, 1996 | [JP] | Japan | 8-043791 |
| Mar. 1, 1996 | [JP] | Japan | 8-044333 |
| Mar. 15, 1996 | [JP] | Japan | 8-059531 |

[51] Int. Cl.$^6$ .............. D05B 21/00; D05C 5/02
[52] U.S. Cl. .............. 112/102.5; 112/470.04; 112/445; 112/458
[58] Field of Search .............. 112/445, 456, 112/454, 457, 458, 102.5, 470.01, 470.04, 470.06

[56]  References Cited

U.S. PATENT DOCUMENTS

| 4,648,341 | 3/1987 | Kato et al. | 112/458 |
| 4,688,503 | 8/1987 | Kato | 112/445 |
| 5,074,232 | 12/1991 | Matsubara et al. | 112/456 X |
| 5,383,413 | 1/1995 | Hayasi | 112/102.5 |
| 5,427,044 | 6/1995 | Hirabayashi | 112/445 X |

*Primary Examiner*—Peter Nerbun
*Attorney, Agent, or Firm*—Oliff & Berridge, PLC

[57]  ABSTRACT

A sewing pattern display device including a display for displaying a plurality of options relating to sewing; a transparent touch panel disposed adjacent to the display and capable of detecting a position where the touch panel is pressed; and a control device for determining, based on detection by the touch panel, a position of the display corresponding to a pressed position of the touch panel and, when the touch panel is pressed to simultaneously indicate more than one of the options, processing an option different from the indicated options.

28 Claims, 15 Drawing Sheets

SEWING MACHINE WITH DISPLAY FOR SELECTING SEWING PATTERNS

BACKGROUND OF THE INVENTION

1. Field of the Invention

The present invention relates to a sewing pattern display device including a display screen and a transparent touch panel, disposed in front of the display screen, for enabling input of options displayed on the display screen.

2. Description of the Related Art

FIG. 1 (a) shows a conventional sewing machine capable of sewing embroidery in predetermined patterns onto a workpiece cloth, based on embroidery data corresponding to embroidery patterns, that is, sewing patterns, such as pictures, text, and the like. Data relating to the sewing patterns is supplied from a ROM internally provided to the sewing machine or from an external memory device, such as a ROM card, freely detachable to the sewing machine.

A display device such as an LCD is provided to the front of the sewing machine. A plurality of embroidery patterns can be displayed on the display device. A transparent digital touch panel divided into a lattice is disposed in front of LCD. Although indicated by broken lines in FIG. 1 (b), this lattice is invisible to the eye. Contact points for detecting pressure are provided in the touch panel, one in each region encompassed by the broken lines in FIG. 1 (b). The LCD displays operational keys in correspondence with the contact points. In each screen displayed on the LCD, each operation key has a one-to-one correspondence with a specific input command or process. In order to perform a specific input operation, the user must touch the touch panel at a position directly in front of the operation key corresponding to the desired input operation. In other words, when a particular region of the lattice is pressed, the CPU of the sewing machine performs an operation corresponding to the operation key of the depressed region.

The size of the lattice regions is determined by the width of band-shaped electrodes of the touch panel and by the distance between the band-shaped electrodes. In general, one region corresponds to the size of a human finger tip. This type of digital touch panel is commonly used in sewing machines.

To select a desired pattern, the user switches display of the LCD to a pattern selection screen and presses a portion of the screen corresponding to the desired pattern. After selecting the desired pattern, the user then switches the sewing machine to its position editing mode for enabling the user to position the selected pattern in a desired position with respect to a sewable region, in which the sewing machine is capable of sewing. The sewable region corresponds to the area of the frame supporting the workpiece cloth to be embroidered on.

As shown in FIG. 1 (b), in the position editing mode a frame 200, representing the sewable region, that is, the frame of the sewing machine, and operation keys 210a through 210d, indicating directions in which the selected pattern or patterns can be moved in the frame 200, are displayed on the same screen. The embroidery pattern selected by the user is displayed in the frame 200 and can be moved across the frame 200 in the directions indicated by the operation keys 210a through 210d by pressing the operation keys 210a through 210d. In order to position a pattern in a manner desired by the user, the user views the image in the frame 200 to gain a feel for overall balance of the patterns. Then the user moves the patterns until the overall pattern is arranged to his or her liking. For example, when the user wants to move the embroidery position to the lower left of the screen 200, the user presses the leftward movement key 210a and then presses the downward movement key 210d.

In the example shown in FIG. 2, an additional four movement keys 215a through 215d are provided for enabling the user to move the selected sewing pattern in diagonal directions in a single operation. In this case, the user would merely press the lower leftward movement key 215d to move the selected sewing pattern to the lower left side of the frame 200.

There has been known an analog type touch panel shown in FIG. 3. The analog type touch panel is configured with two electrode sheets, that is, an X-sheet 1300 and a Y-sheet 1400, disposed in confrontation with each other. Electrodes are arranged near each other in electrode lines 1303, 1403, which intersect each other at positions of the electrodes. The X-sheet 1300 has two harnesses 1301, 1302 attached at opposite ends of the X-sheet 1300. The Y-sheet 1400 has two harnesses 1401, 1402 attached at opposite ends of the Y-sheet 1400. All the harnesses are connected to ports of a control device. The harness of one of the sheets are applied with voltage while one of the harness of the other sheet outputs a voltage to the control device. These roles are switched at a predetermined timing by the control device. When a particular position of the touch panel is pressed, a voltage will develop at the input harness depending on the resistance values between the voltage harnesses and the pressed position. By the control device switching roles of the sheets, two voltage values are obtained for the pressed position. Since one combination of two voltage values is specific to each position on the touch panel, the control device can determine the pressed position.

SUMMARY OF THE INVENTION

The larger the size of the frame 200, the easier it is for the user to observe movement of the pattern across the frame 200. However, in digital type touch panels, regardless of how narrow the width of the band-shaped electrodes or no matter how many band-shaped electrodes are provided, each electrode must be separately connected to the CPU using a separate harness. Therefore, when the display screen and the touch panel in front of the display screen are made in a large size, connection operations become complicated and assembling the touch panel becomes inefficient. Also, a great more number of components are required so that the cost of manufacturing the sewing machine increases greatly. Also, in touch panels, the CPU must be provided with a number of ports equal to the number of harness lines. Therefore, sewing machines are often provided with small display screens. It is especially undesirable to have costly and complicated display devices in household sewing machines so a small LCD is normally used.

When positioning a pattern in the manner described above, the final positioning of the pattern can be easily confirmed when the pattern is displayed as an image on the display device. However, displaying the entire image requires a large screen area. Therefore, when a small LCD is used, the pattern can only be displayed in a simple concise manner as represented by a figure form 220. When the pattern is displayed in the frame in a figure form 220, it is difficult for the user to imagine how the pattern will appear when finished. Because a great number of new external memory devices are constantly being produced, the number of patterns that sewing machines are capable of embroidering also increases. It can be estimated that the embroidery patterns will become increasingly large and complicated and also more varied. For example, patterns will conceivably be available to be sewn in mirror images or in images similar to a predetermined image. Therefore, the need for a user to be able to visually confirm the arrangement and appearance of completed patterns increases. There is therefore a need for a display screen having a simple configuration for displaying patterns while they are being arranged.

Also, when the size of the LCD is a small size, the larger the display of the frame 200, the less room will be available for displaying the operation keys 210a through 210d.

Two methods are described above that a user can use to subjectively move a pattern in the lower leftward direction. The first method is to move the pattern directly in the lower leftward direction, for example, by using the lower leftward movement key 215d shown in FIG. 2. The second method is to first move the pattern leftward using the leftward movement key 210a and then to move the pattern downward using the downward movement key 210b in a series of operations as shown in FIG. 1 (b).

In order to display operation keys for diagonal movement, such as the special keys for upper rightward and lower leftward movement shown in FIG. 2, the LCD must be made large so that its display screen has a large area. When the LCD can not be made in a large size, either the operation keys must be made in a small display so that they are difficult to see and operate or the frame representing the embroidery region of the sewing machine must be displayed in a small area. Further, because a great number of movement operation keys are provided, information relating to the subject embroidery pattern can not be displayed because the screen is filled up with movement keys.

On the other hand, if the number of movement keys is reduced to the minimum number, that is, if keys are provided only for moving the sewing pattern vertically and horizontally, then the user must rely on the second method to move patterns in diagonal directions. In this case, the user must divide operations into ones for horizontal movement and ones for vertical movement, which is inconvenient.

When a digital type touch panel is used, because positions of the screen are detected according to regions, a portion or all of only one operation key can be displayed in correspondence with a single region. When more than one of the operation keys 210a through 210d is displayed in correspondence with a single region, the control device can not determine what operation is desired to be selected.

In other words, because operation keys and corresponding operations have a one-to-one correspondence, the user must press a specific location of the touch panel in order to input a specific command. This configuration is insufficient for users to subjectively arrange patterns. The lattice of the touch panel limits the arrangement of the operation keys and also the operations that can be performed using the touch panel. Freedom of operation of the sewing machine is poor as a result.

Further, in an embroidery sewing machine wherein data is supplied from an external memory device, it is necessary to change the displayed screen to match inputted content from an increased variety of external memory devices. A digital type touch panel can only display inputted content in a manner that matches the shape and size of its detection regions. Therefore, the method for displaying the inputted content is extremely restricted.

Also, because only one operation key can correspond to one lattice region, there are limits to how close together the operation keys 210a through 210b can displayed. For example, when the operation keys 210a through 210d are displayed in a small area, only four movement keys for providing the minimum movement directions of up, down, left, and right can be displayed. Although it is conceivable to display operation keys 220A close together as shown in FIG. 4 (a), such a display is actually impossible because more than one operation key will be located in the same lattice region of the touch panel. Therefore, operation keys must be displayed with spaces opened therebetween, such as the operation keys 220B shown in FIG. 4 (b).

A third conceivable method to move a pattern in the lower leftward direction would be to combine leftward and downward movement operations together into one operation by pressing the leftward movement key and the downward key simultaneously. In the conventional sewing machine described above, the sewing machine is capable of following commands when the user inputs them according to the first and the second methods. However, conventional machines are incapable of performing a process different from a process corresponding to a pressed region of the touch panel. That is, conventional sewing machines are incapable of following command inputted by the user using the third method. For this reason, the user must conform his method of operation with the capability of the sewing machine. Also, patterns can only be gradually moved across the screen based on the duration of time or the number of times the operation keys 210a through 210b is pressed by the user.

It is an objective of the present invention to overcome the above-described problems and to provide a sewing pattern display device with great freedom of operation.

In order to achieve the above-described objectives, a sewing machine according to the present invention includes a display for displaying a plurality of options relating to sewing; a transparent touch panel disposed adjacent to the display and capable of detecting a position where the touch panel is pressed; and a control device for determining, based on detection by the touch panel, position of the display corresponding to a pressed position of the touch panel and, when the touch panel is pressed to simultaneously indicate more than one of the options, processing an option different from the indicated options.

With this configuration, when the touch panel is pressed to individually indicate separate options, then the control device independently performs the indicated options. However, when the touch panel is pressed to indicate a plurality of options, the control device performs an option different from any of the indicated options. With this configuration, operations and processes can be performed using a variety of methods so that the device has greater freedom of operation.

Similarly, when the touch panel is pressed to indicate individual operations for moving the subject pattern in separate directions, then the control device moves the subject pattern separately in the directions indicated. However, when the touch panel is pressed to simultaneously indicate moving the subject pattern in a plurality of directions, then the control device moves the subject pattern in a direction different from any of the indicated directions. In this case also, a greater diversity of operations for moving subject pattern is available to the user so that operations can be more freely performed.

According to another aspect of the present invention, an analog type touch panel is used. When an analog type touch panel is used, detection of pressed position is performed in an analog manner, not by regions as in digital touch panels.

Therefore, different sized operation keys can be displayed in gradations in range from small to large sized keys. Input using display of a variety of different shaped operation keys can be detected Eight directional movement operation keys can be displayed so that the user has a larger number of movement direction keys to choose from and the sewing machine has greater operability. This good effect can be further enhanced when an analog type touch panel is used. In this case, the eight directional movement operation keys can be disposed near each other so that a large display region for displaying the selected sewing patterns can be secured.

Further, an analog type touch panel is less expensive than a digital touch panel and so is more suitable for use in a household sewing machine. Also, pressed positions can be detected in more detail and with greater flexibility using an analog type touch panel because resistant values are determined based on pressed positions rather than on pressed regions. Therefore, even if the display screen and the touch panel are made in a large size, because the touch panel is an analog type touch panel, manufacturing costs can be reduced and the configuration can be simplified.

According to another aspect of the present invention, sewing patterns are displayed as images according to their positional relation in the sewing region. Therefore, when arranging the sewing patterns, images of the sewing patterns can be visually confirmed so that positioning of sewing patterns becomes extremely easy. Also, sewing patterns can be displayed according to positions pressed in the sewing region.

Operation keys can be disposed in an annular configuration and displayed on the same screen as an operation key disposed in the center of the annularly configured operation keys. Therefore, input relating to sewing patterns can be rapidly performed according to detection of pressure against the touch panel. This effect can be further enhanced when the operation keys are displayed near each other as allowed by using an analog type touch panel.

According to another aspect of the invention, all eight possible movement directions in which the pattern can be moved are displayed as arrows so that the user can confirm the movement direction of the pattern before using one of the arrows to move the pattern. In this case also, a greater variety of movement operations for moving the sewing patterns are available to the user so that operations can be performed more freely.

According to another aspect of the invention, while the sewing pattern is presently being moved, even if the operator presses a key indicating a new movement direction, the control device will continue to move the sewing pattern in the present movement direction. Therefore, there is no need for the user to consider the effect the newly added movement direction will have on the present movement direction of the pattern. Processes relating to moving the sewing pattern can be performed more smoothly.

According to another aspect of the present invention, when the user simultaneously presses two keys indicating opposite directions, the control device automatically moves the sewing pattern to the center of the sewing region display. Therefore, one method for moving the sewing pattern can be used to move the sewing pattern in a different manner so that the operations can be more freely performed.

When information relating to the selected sewing patterns is displayed near the operation keys, a small sized display screen is sufficient for displaying a variety of operation keys and information. Further, when moving the sewing patterns, the user can more easily refer to information relating to the subject pattern.

When the display device displays individual sewing patterns and their composite patterns on the same screen, a user can select a composite pattern by indicating either component patterns or the composite pattern so that a greater variety of methods for selecting patterns are made available to the user.

In still another aspect of the present invention, the touch panel is an analog type touch panel so that sufficient area can be secured for displaying sewing patterns. When options are displayed on the display based on data from an external memory device, then a greater number of options for inputting processes become available to the user so that the device is easier to operate. Further, operations corresponding to data from a variety of external memory units can be detected.

BRIEF DESCRIPTION OF THE DRAWINGS

The above and other objects, features and advantages of the invention will become more apparent from reading the following description of the preferred embodiment taken in connection with the accompanying drawings in which:

FIG. 1 (b) is a plan view schematically showing a screen shown on a liquid crystal display (LCD) of the conventional sewing machine;

FIG. 4 (b) is a plan view showing a functional arrangement for operation keys with respect to a digital type touch panel;

DETAILED DESCRIPTION OF THE PREFERRED EMBODIMENTS

Figure 1A:
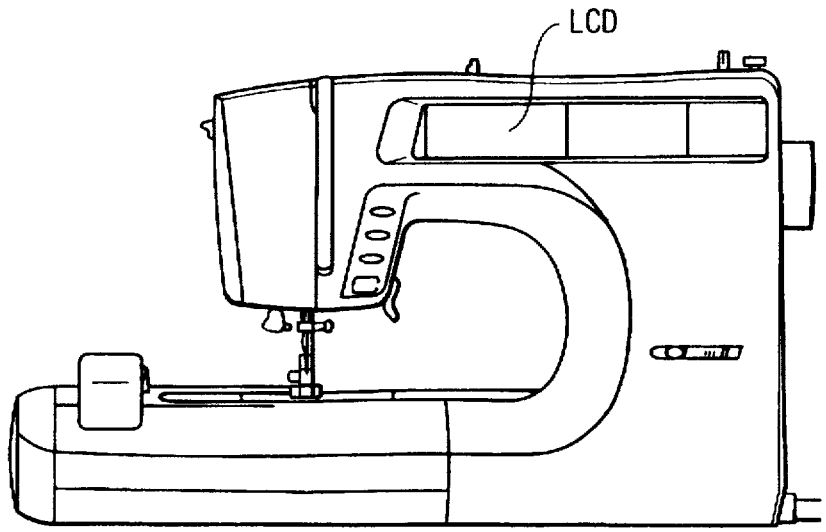
FIG. 1 (a) is a side view showing a conventional sewing machine.
Figure 1B:
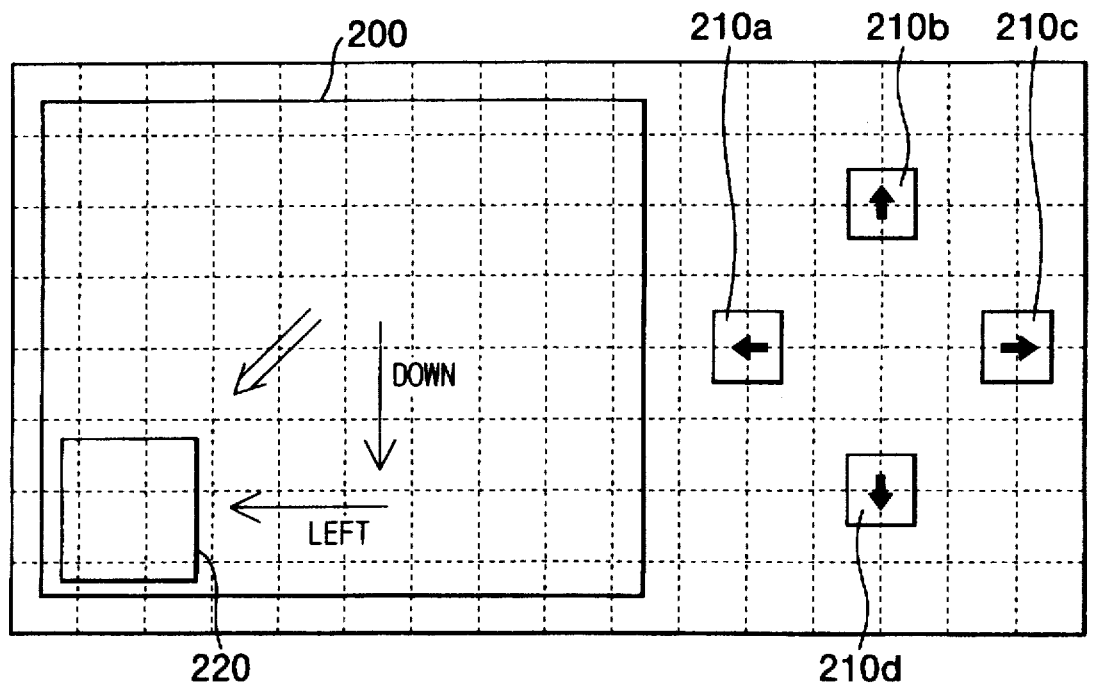
Figure 2:
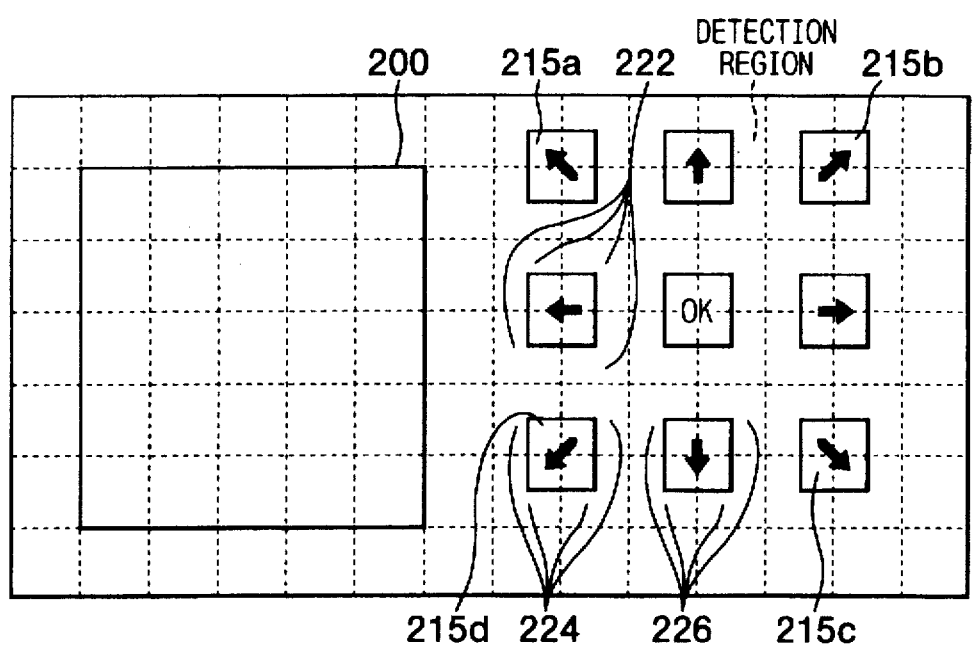
FIG. 2 is another example of a screen shown on the LCD.
Figure 3:
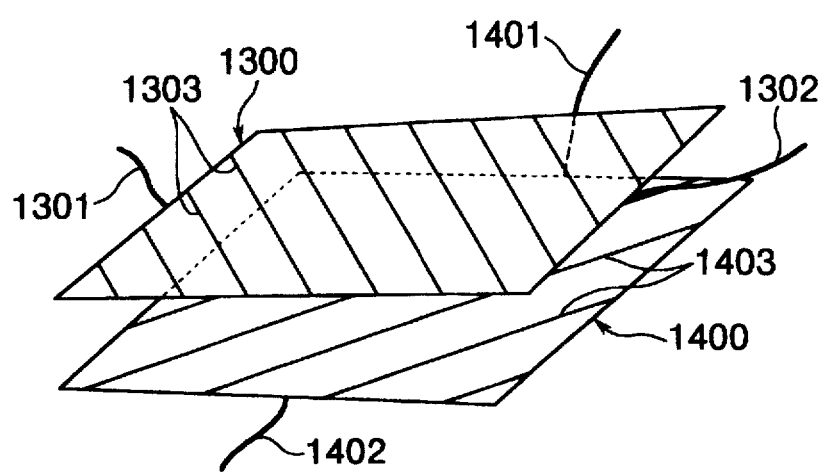
FIG. 3 is a schematic view showing configuration of a conventional analog type touch panel.
Figure 4A:
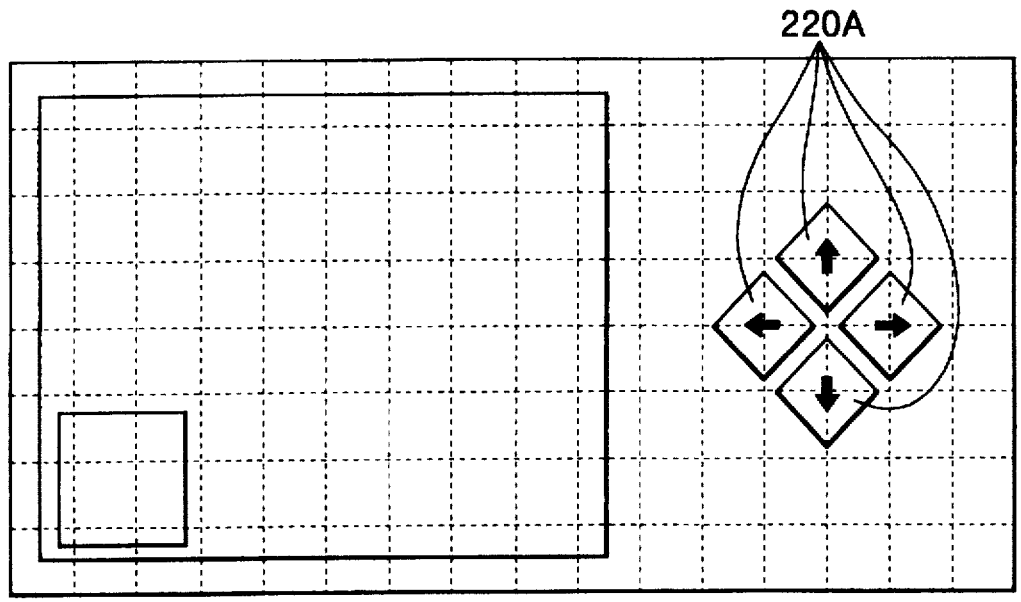
FIG. 4 (a) is a plan view showing a nonfunctional arrangement for operation keys with respect to a digital type touch panel.
Figure 4B:
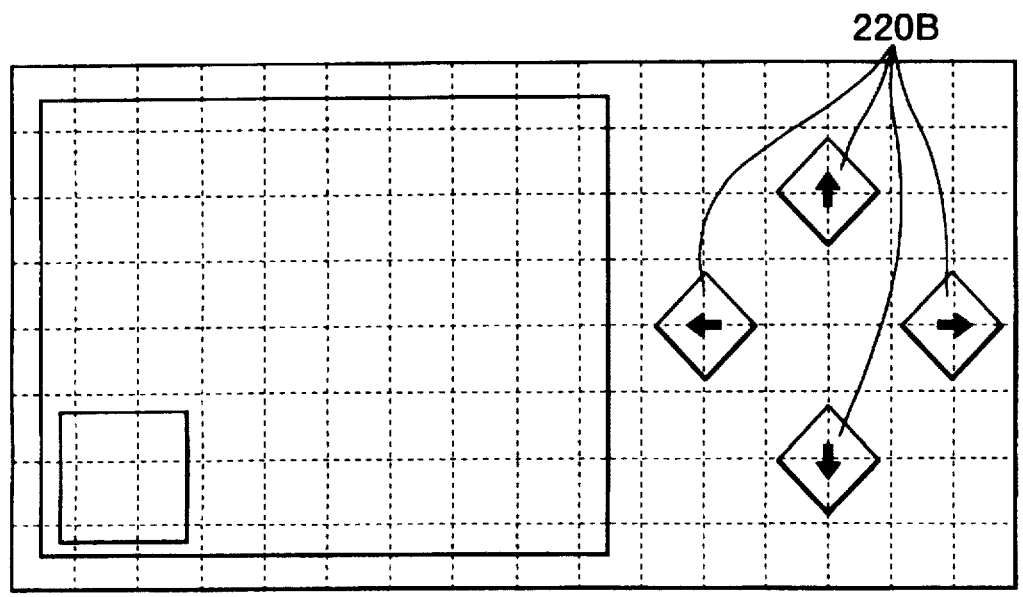

A sewing pattern display device according to a preferred embodiment of the present invention will be described while referring to the accompanying drawings wherein like parts and components are designated by the same reference numerals to avoid duplicating description. The embodiment describes the present invention applied to a household embroidery sewing machine 11.

Figure 5:
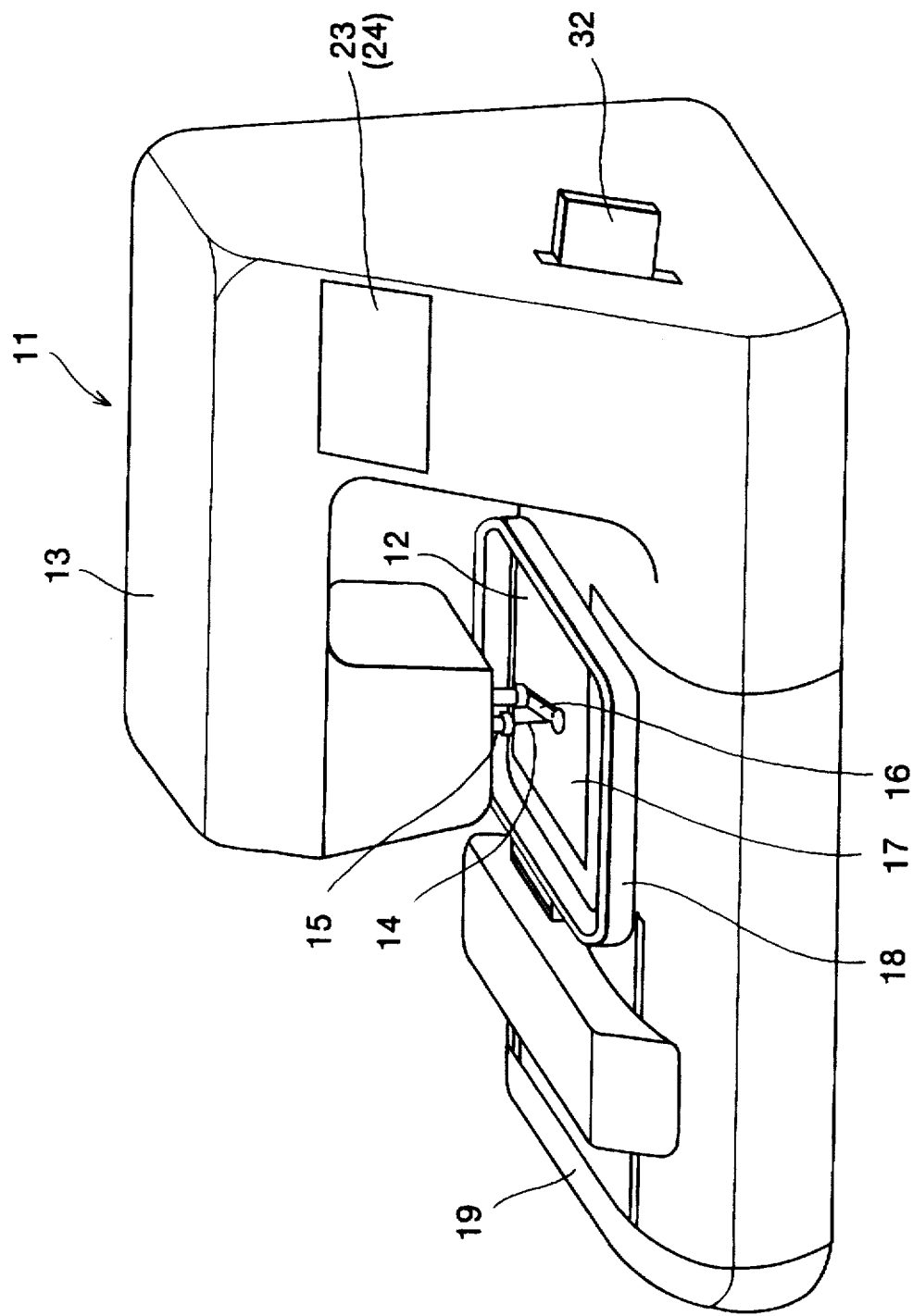
FIG. 5 is a perspective view showing a sewing machine according to an embodiment of the present invention.

FIG. 5 is a perspective view schematically showing the embroidery sewing machine 11. The sewing machine 11 includes a sewing machine bed 12 and an arm portion 13 formed integrally with the sewing machine bed 12. A sewing needle bar 15, having a needle 14, and a presser foot 16 are provided to the tip of the arm portion 13. A needle plate 17 is provided to the upper surface of the sewing machine bed 12 at a position corresponding to the needle bar 15. A shuttle mechanism (not shown in the drawings) is provided at a position under the needle plate 17. Although not shown in the drawings, a drive mechanism and a sewing machine motor are provided for driving the needle bar 15 and the shuttle mechanism in synchronization with the pressing feet 16 in order to execute sewing operations.

An embroidery frame 18 and a horizontal movement mechanism 19 are provided to the sewing machine bed 12. The embroidery frame 18 is for supporting a workpiece cloth during embroidery sewing operations. The embroidery frame 18 has a substantially rectangular shape and includes an outer frame and an inner frame between which the workpiece cloth is sandwiched. With this configuration, the workpiece cloth can be supported stretched tightly across the interior of the frame 18. The horizontal movement mechanism 19 is for moving the embroidery frame 18, and consequently the workpiece cloth, freely in the horizontal direction over the sewing machine bed 12.

Next, an embroidery sewing operation will be briefly described. A movement body 20 is configured to move the embroidery frame 18 freely in a Y-axis direction, that is, frontward and rearwards as viewed in FIG. 5, using a Y-axis motor (not shown in the drawings). The horizontal movement mechanism 19 moves the movement body 20 freely in an X-axis direction, that is, leftwards and rightwards as viewed in FIG. 5, by an X-axis motor (not shown in the drawings). The horizontal frame 19 moves the workpiece cloth supported by the embroidery frame 18 to an optional position based on an X-Y coordinate system of the horizontal movement mechanism 19. Embroidery sewing is performed by driving the needle bar 15 using the above-described drive mechanism while moving the workpiece cloth by using the horizontal movement mechanism 19.

A start/stop key 21 is provided to the front surface at the tip of the arm portion 13. A power switch 22 is provided to the lower right side surface of the sewing machine 11. The sewing machine 12 of the present embodiment is capable of performing a variety of practical sewing operations, such as, straight-line sewing, zigzag sewing, and overcasting. The horizontal movement mechanism 19 is detachably mounted on the sewing machine bed 12 so that when embroidery is not being sewn, the horizontal movement mechanism 19 can be removed from the sewing machine bed 12 with the embroidery frame 18 and replaced with a flat table for normal sewing.

Figure 11:
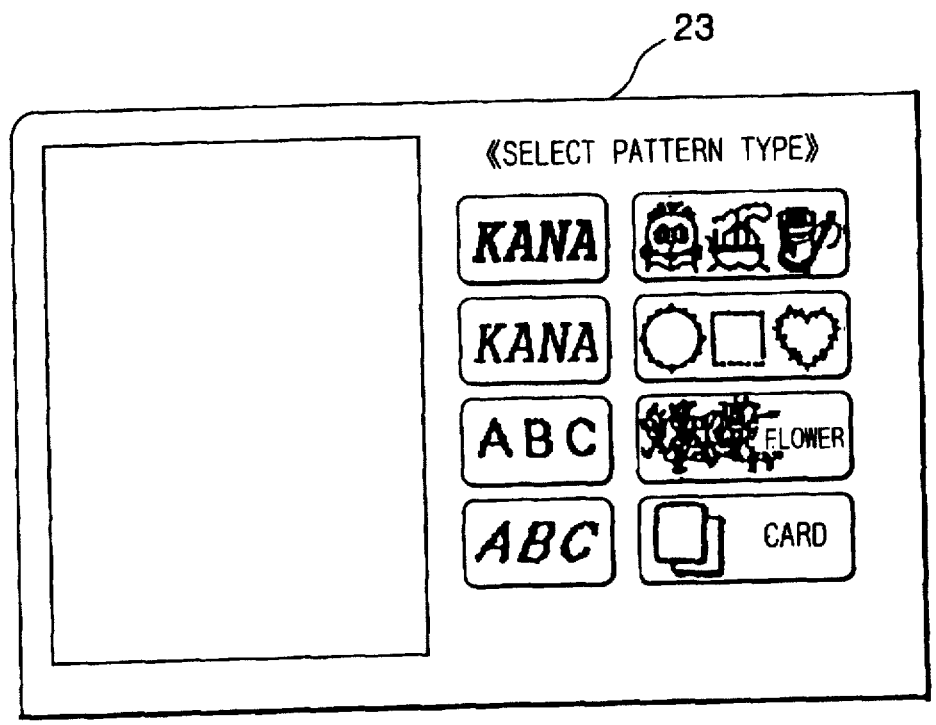
FIG. 11 is a plan view showing a pattern selection screen displayed on an LCD of the sewing machine.
Figure 12:
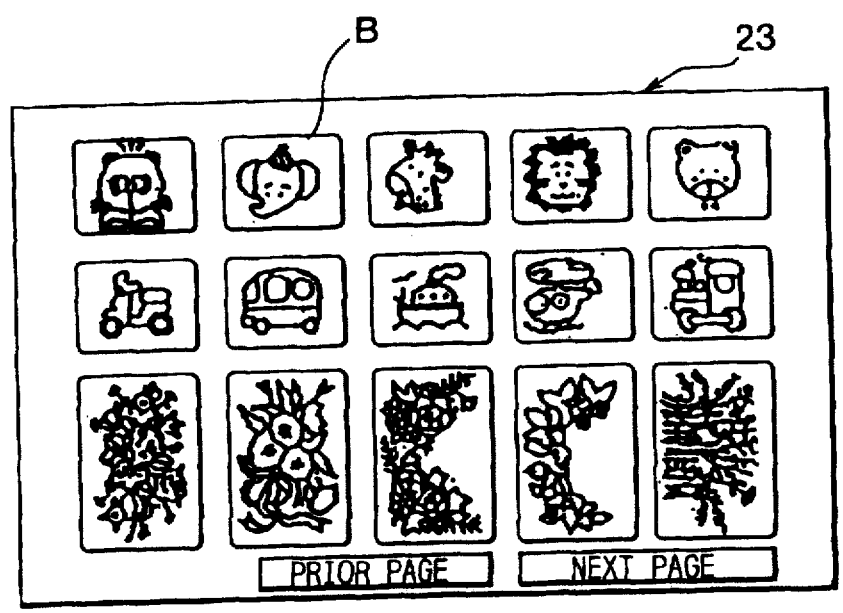
FIG. 12 is a plan view showing another pattern selection screen displayed on an LCD.
Figure 14:
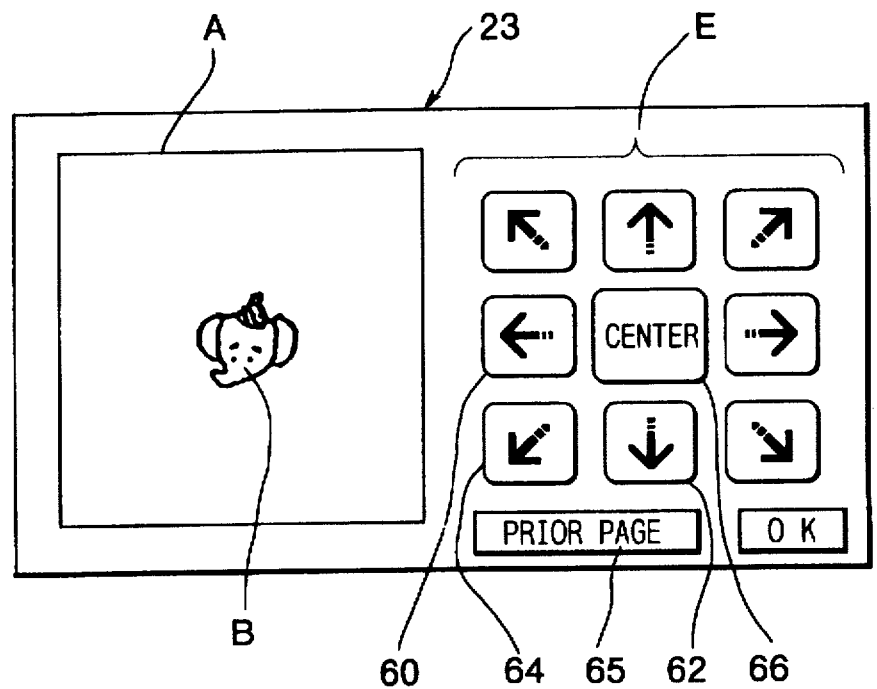
FIG. 14 is a plan view showing a pattern editing screen displayed by the LCD.
Figure 16:
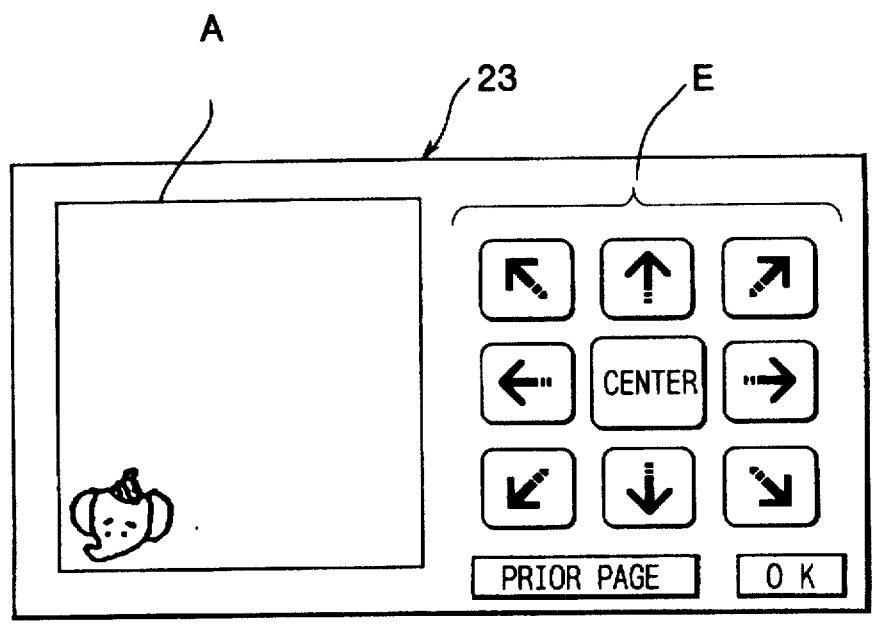
FIG. 16 is a plan view showing the pattern editing screen after movement processes have been performed on a subject pattern displayed on the LCD.

A monotone, that is binary, liquid crystal display (LCD) 23 is provided to the front surface of the arm portion 13. The LCD 23 is for displaying a variety of patterns, messages, and options relating to sewing. Options relating to sewing include sewing patterns, which are selected when pressed, movement directions, in which a subject pattern can be moved, and positions, to which the subject pattern can be moved by pressing. As will be described later, the LCD 23 is used to display pattern selection screens, such as shown in FIGS. 11 and 12, and pattern position editing screens, such as shown in FIGS. 14 and 16, which the user uses to edit arrangement, size, and the like of sewing patterns. Further, an analog touch panel 24 is provided on the surface of the LCD 23. The LCD 23 displays operation keys at positions corresponding to different function positions of the touch panel 24. It should be noted that the touch panel 24 is configured to register a predetermined initial value of, for example, 0 if not pressed at any position.

Figure 6:
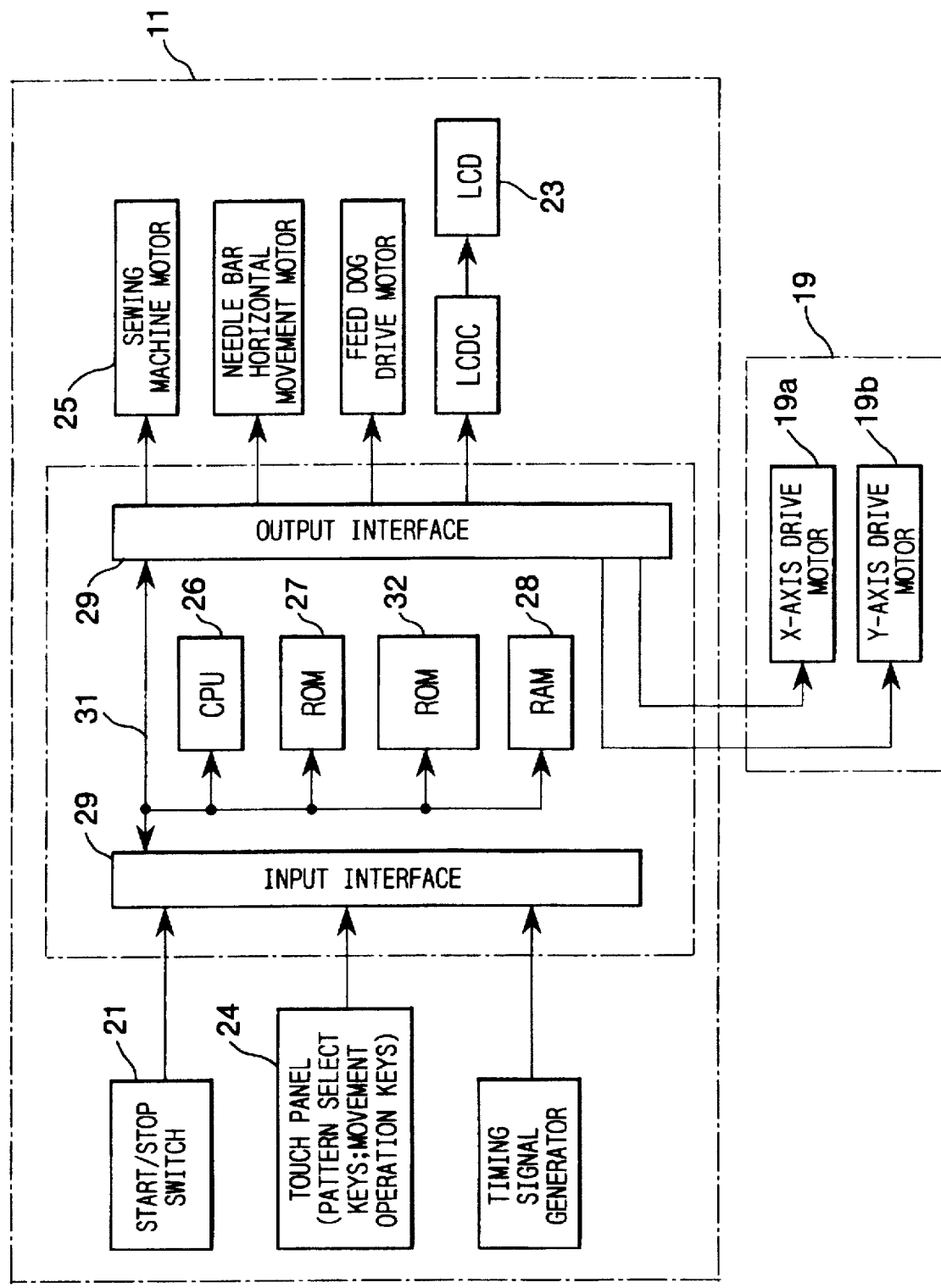
FIG. 6 is a block diagram showing electrical connection of components in the sewing machine.

As shown in FIG. 6, a control device 25, such as a microcomputer, for controlling the various mechanisms described above is provided in the sewing machine 11. The control device 25 includes a CPU 26, a ROM 27, a RAM 28, a controller 29, and an input/output interface 30, all connected by a bus 31. Via the controller 29, the control device 25 controls components such as the sewing machine motor and the X-axis and Y-axis motors of the horizontal movement mechanism 19. The LCD 23 and the touch panel 24 are also connected to the input/output interface 30.

The ROM 27 stores control programs for controlling practical sewing operations and embroidery sewing operations of the sewing machine 11; a control program for controlling display of the LCD 23; and a data processing program for performing editing and other data processes on retrieved embroidery data. As will be described later, the control device 25 executes the control program for controlling display of the LCD 23 in order to control a variety of displays.

Figure 19:
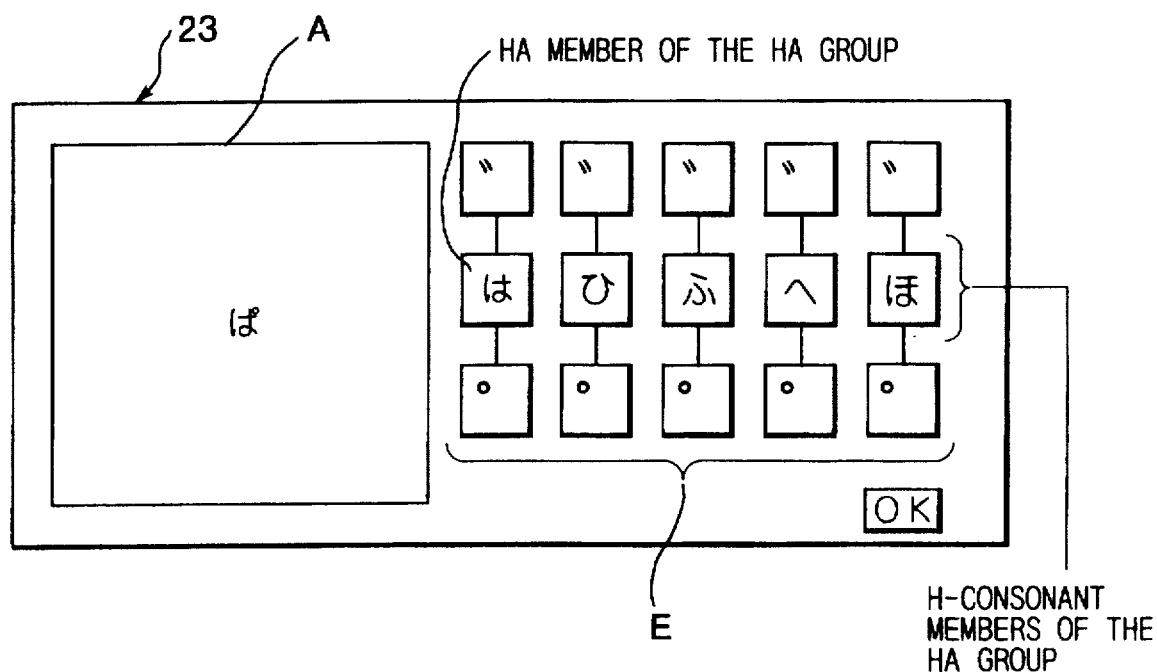
FIG. 19 is a plan view showing a position editing screen according to a third modification of the embodiment.

The ROM 27 stores pattern data for accurately sewing a plurality of individual embroidery patterns. The ROM 27 stores pattern data for ornamental patterns formed by relatively simple shapes and patterns, for symbols and characters, such as, alphanumeric characters and kana, a portion of which are shown in FIG. 19.

In the present embodiment, the pattern data includes embroidery data required for embroidery sewing; display data formed from bit map data required to display each pattern on the LCD 23; and appended data, such as thread color data, appended to the embroidery data and the display data. The embroidery data is stored in the form of contour data for indicating an external outline, that is, contour, of each pattern. When embroidery sewing is to be performed, calculations are performed on the contour data to develop it into embroidery data indicating each stitch position, that is, movement amounts across the workpiece cloth in the X and Y directions for each stitch. Alternatively, the same data can be used for both embroidery data and display data. In other words, only one set of data needs to be stored and other sets of data can be developed from the stored set.

In the present embodiment, an external card ROM 32, serving as a memory means, is detachably connected to the control device 25. The external card ROM 32 stores pattern data, such as embroidery data, display data, and appended color related data, corresponding to relatively complicated picture patterns. Accordingly, both the ROM 27 and external card ROM 32 serve as memory media in the present embodiment. To connect the external card ROM 32 to the control device 25, a user freely detachably inserts the external card ROM 32 into a card insertion slot 33 provided to the right side wall of the sewing machine 11.

In order to perform embroidery sewing and normal sewing, the control device 25 controls the various mechanisms of the sewing machine 11 based on the programs stored in the ROM 27 and based on operations selected by the user pressing the touch panel 24.

Figure 7:
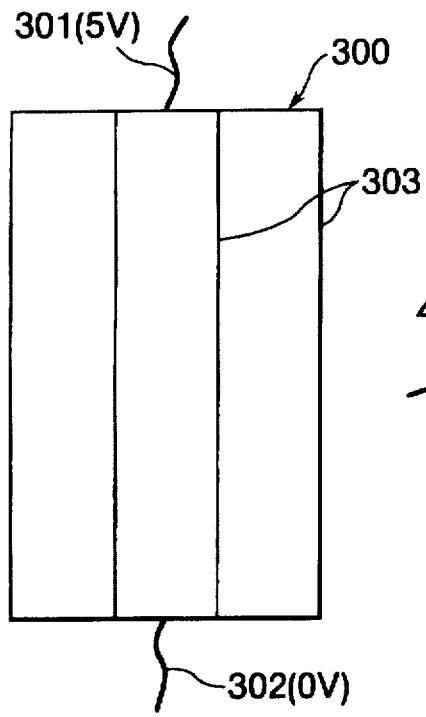
FIG. 7 is a schematic view showing an X-sheet of an analog touch panel used in the sewing machine.
Figure 8:
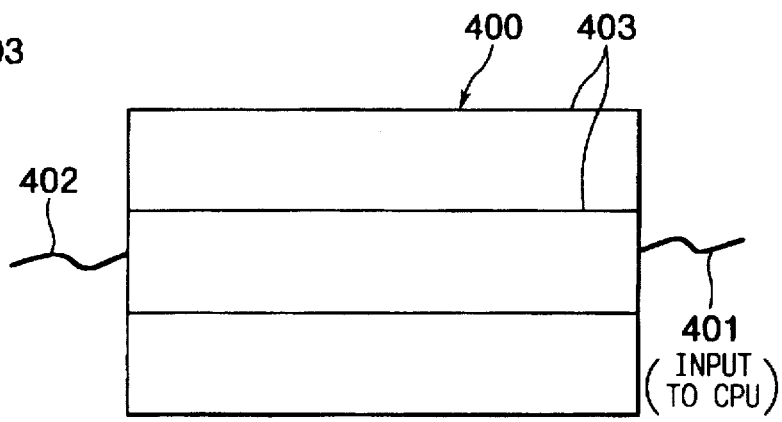
FIG. 8 is a schematic view showing a Y-sheet of the analog touch panel.
Figure 9:
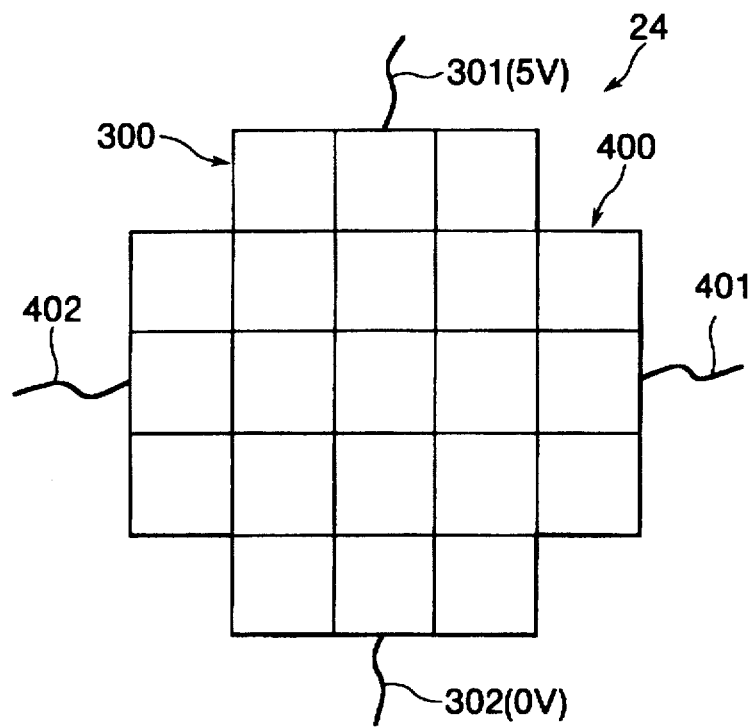
FIG. 9 is a schematic view showing positional relationship between the X-sheet and the Y-sheet of the analog touch panel.

The analog type touch panel 24 includes two electrode sheets, that is, an X-sheet 300 and a Y-sheet 400 shown in FIGS. 7 and 8, respectively. The X-sheet 300 and the Y-sheet 400 are disposed in confrontation with each other as shown in FIG. 9. Electrodes are arranged near each other in electrode lines 303, 403 running in parallel across corresponding electrode surfaces of the X-sheet 300 and the Y-sheet 400, respectively. The electrode lines 403 intersect the electrodes lines 303 so that positions of electrodes match. The X-sheet 300 has two harnesses 301, 302 attached to opposite ends of the X-sheet 300. The Y-sheet 400 has two harnesses 401, 402 attached to opposite ends of the Y-sheet 400. All of the harnesses are connected to ports of the CPU 26.

FIGS. 7 and 8 show the case when voltage is applied to the harnesses 301, 302 of the X-sheet 300 and outputted to the CPU 26 via the Y-sheet 400. However, the control device 25 switches these roles at a predetermined timing to determined pressed position as will be described later. As shown in FIG. 7, first a 5 volt voltage is applied to the harness 301 and a 0 volt voltage is applied to the harness 302 of the X-sheet 300. As shown in FIG. 8, the harness 401 of the Y-sheet 400 is connected to an input port of the CPU 26. With this configuration, the CPU 26 and touch panel 24 can be connected by a mere two pairs of harnesses. In some cases, the CPU 26 is provided with a separate input port for detecting voltage only (that is, not for applying voltage). In these cases, three harnesses are required to connect the CPU 26 and the touch panel 24.

Figure 10:
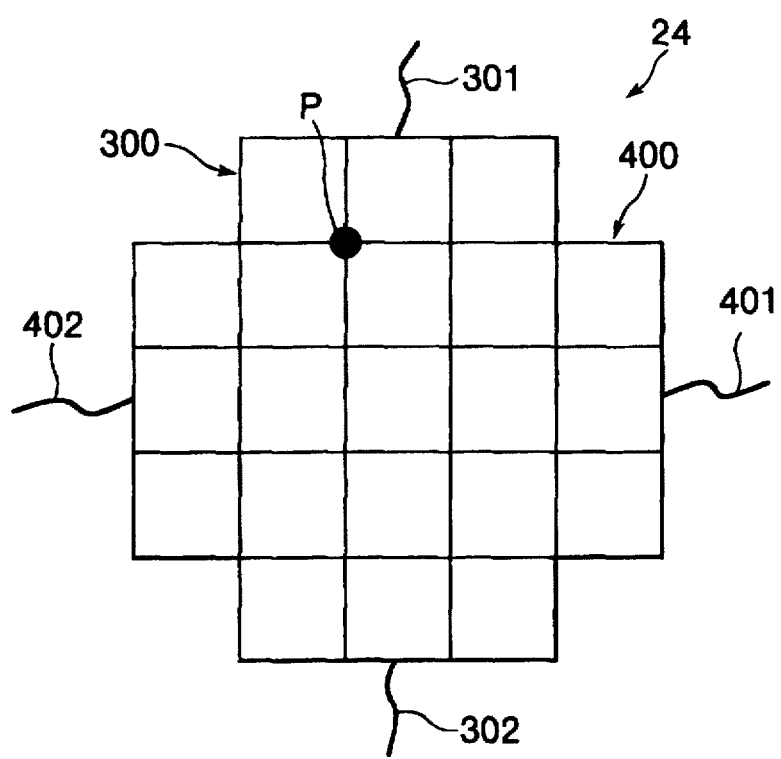
FIG. 10 is a schematic view showing an example of when a user presses a position P of the analog touch panel.

FIG. 10 shows an example of when a user presses a position P on the touch panel 24. The voltage inputted to the CPU 26 is determined using voltage division ratios of voltage values inputted sequentially from via the X-sheet 300 and the Y-sheet 400. First, when voltage is applied to the X-sheet 300 as shown in FIG. 9, the voltage developed at the harness 401, and consequently inputted to the CPU 26, depends on the resistance between the harness 301 and the position P, and between the position P and the harness 302. Then the CPU 26 switches the roles of the X-sheet 300 and the Y-sheet 400 so that a voltage developed at the harness 301, and consequently inputted to the CPU 26, depends on the resistance between the harness 401 and the position P, and between the position P and the harness 402. By comparing inputted voltages detected by the reversing detection roles of the X-sheet 300 and Y-sheet 400 with prestored voltage values for different positions on the touch panel 24, the pressed position on the touch panel can be detected. Because the electrodes are arranged on a line, more gradual changes in position detection can be detected than with digital touch panels. Also, the user can freely determine overall balance of the embroidery pattern based on his own aesthetic sense.

As will be clear by the following explanation, the control device 25 controls the LCD 23 to display a variety of pattern selection screens, such as that shown in FIG. 12, for displaying a plurality of individual patterns. The control device 25 displays these screens in its pattern selection mode, which a user uses to select patterns he or she wishes to embroider. In a manner to be described below, the user can select one or more patterns by touching the touch panel 24 to operate one of the pattern selection screens. Predetermined data for the selected embroidery patterns is then stored into predetermined memory regions of the RAM 28 in the order selected. Embroidery sewing operations are then performed in the order the patterns are selected.

When the sewing machine 11 is switched on, the control device 25 displays a pattern group selection screen on the LCD 23 as shown in FIG. 11. In the pattern group selection screen, eight different pattern types into which the plurality of embroidery patterns are divided are displayed in a selection area of the pattern selection screen. When the user touches an operation key labeled "card" on the touch panel 24, the pattern selection screen on the LCD 23 will change to the screen shown in FIG. 12. In this example, a plurality of picture patterns, such as a panda picture, an elephant picture, and a giraffe picture, are displayed on the LCD 23 based on the display data stored in the external card ROM 32.

Next, the user views the pattern selection screen and selects an embroidery pattern he or she wishes to have embroidered. In the example shown in FIG. 12, the pattern B for embroidering an elephant embroidery pattern has been selected. The user selects the pattern B of the touch panel 24 of the LCD 23 by touching the displayed portion directly with his or her finger. The pattern selection screen for selecting picture patterns spans a plurality of screen pages. When a desired pattern the user wishes to have embroidered is not shown on the presently displayed page, then the user can view a prior page or a subsequent page by touching page turn keys on the pattern selection screen.

Figure 13:
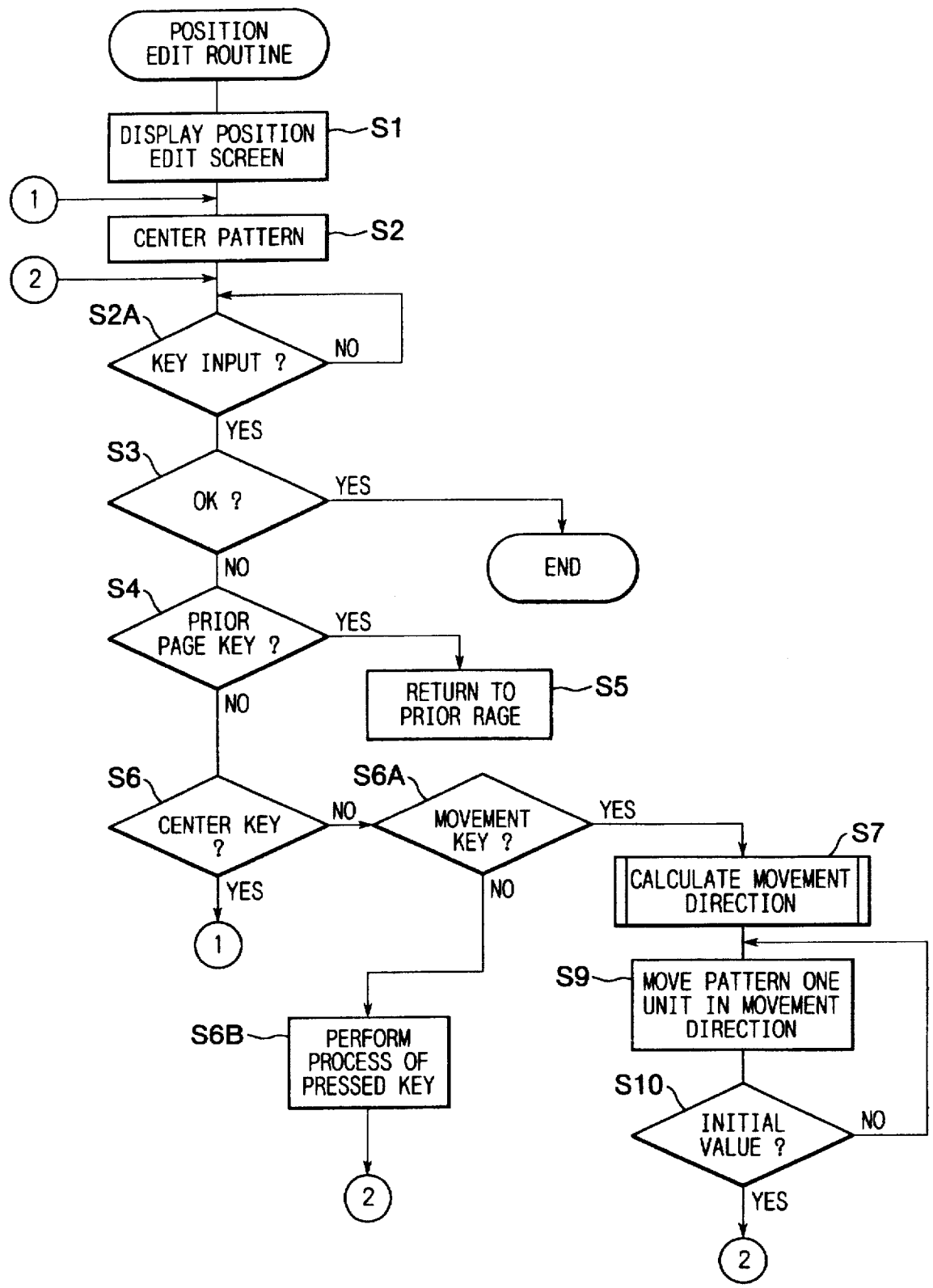
FIG. 13 is a flowchart representing a position edit routine performed by a control device of the sewing machine.

When the user selects the picture pattern B, the sewing machine switches to its position edit mode, whereupon processes represented by the flowchart in FIG. 13 are performed. First, so that the user can next perform position editing processes, the control device 25 displays in S1 a position edit screen shown in FIG. 14 on the screen of the LCD 23.

The position edit screen A includes a layout region A in its left side and a variety of key displays E in its right side. The layout region A represents the embroidery forming region of the workpiece cloth, that is, the sewable region of the sewing machine 11 as defined by the embroidery frame 18, and is shown encompassed by a frame in the left-hand portion of the LCD 23 in the position edit screen A.

The key displays E are images of operation keys and so will be referred to as operation keys E hereinafter. The operation keys are displayed in the operation region of the touch panel 24. The operation keys E include eight movement keys indicating movement directions of the embroidery pattern across the layout region A. Because the position editing screen includes, on the same screen, images of both the sewing region and of a plurality of movement keys for moving the sewing patterns across the sewing region, the user can easily edit positioning of the sewing patterns while confirming at a glance how the sewing patterns will appear when sewn.

Each movement key includes an arrow encompassed by a separate square. Each movement key functions as a movement operation key for moving the sewing pattern in the direction indicated by the corresponding arrow. The eight movement keys are displayed in a radial pattern to the right side of the layout region A. Arrows indicating movement in opposite directions are displayed in opposition on the same imaginary line. Arrows indicating movement in diagonal directions are displayed sandwiched between arrows indicating horizontal and vertical movement, that is, upward, downward, leftward, and rightward movement. For example, a lower leftward movement operation key 64 is displayed sandwiched between the leftward and downward movement operation keys 60 and 62. Further, a center key 66 for moving the embroidery pattern in a single operation to the center of the layout region A is displayed at the center of the eight movement operation keys. The center key 66 is displayed between movement operation keys indicating opposite directions and so includes the center points of those opposite direction operation keys. The movement operations keys can alternatively be referred to as touch keys. Although not provided in this example, operation keys enabling a user to rotate patterns, change the size of patterns, that is, enlarged or reduced from standard sizes, or change the inter-character distance of patterns can also be displayed in the position edit screen.

Next, the picture pattern B is displayed in the center, that is, the initial position, of the layout region A in S2. Also in S2, the present position of the picture pattern B in the layout region A is stored in the ROM 28. The size of each pattern and spacing between displayed patterns correspond to relative distances and dimensions of how the patterns will appear when embroidered on the embroiderable region of the workpiece cloth, that is, as defined by the embroidery frame 18. That is, an image matching those embroidery patterns when actually sewn into the workpiece cloth is displayed in the layout region A. Therefore, the user can confirm the overall arrangement and inter-pattern spacing of selected embroidery patterns by viewing the layout region A.

Next, whether or not one of the operation keys E has been pressed is determined in S2A. If so (S2A:YES), then which operation key E was pressed is determined in S3, S4, S6, and S6A. The display of the patterns will be changed according to the pressed operation key E so that the user can set a desired layout in which he or she wishes the embroidery pattern to be sewn while viewing the image in the layout region A.

First, whether or not the user pressed a prior page key 65 to view the prior screen in the series of screens is determined in S4. If so (S4:YES), then the prior screen is displayed in S5 and processes are performed relating to the prior screen. If the prior page key 65 was not pressed (S4:NO), then whether or not the center key 66 was pressed is determined in S6. If so, the routine returns to S2, whereupon the subject sewing pattern is displayed in the center of the layout region A. If the center key 66 was not pressed (S6:NO), then whether or not a movement key was pressed is determined in S6A. If not (S6A:NO), then the pressed key is determined and appropriate processes are performed in S6B. Then the routine returns to S2A to wait for further key input.

If a movement operation key is pressed (S6A:YES), then a movement direction calculation routine is performed in S7. For example, when the user simultaneously presses the leftward direction operation key 60 and the downward movement operation key 62 (S6A:YES), in order to move the picture pattern B in the left downward direction, the control device 25 automatically calculates in S7, the movement direction of the embroidery pattern based on the position pressed by the user.

Figure 15:
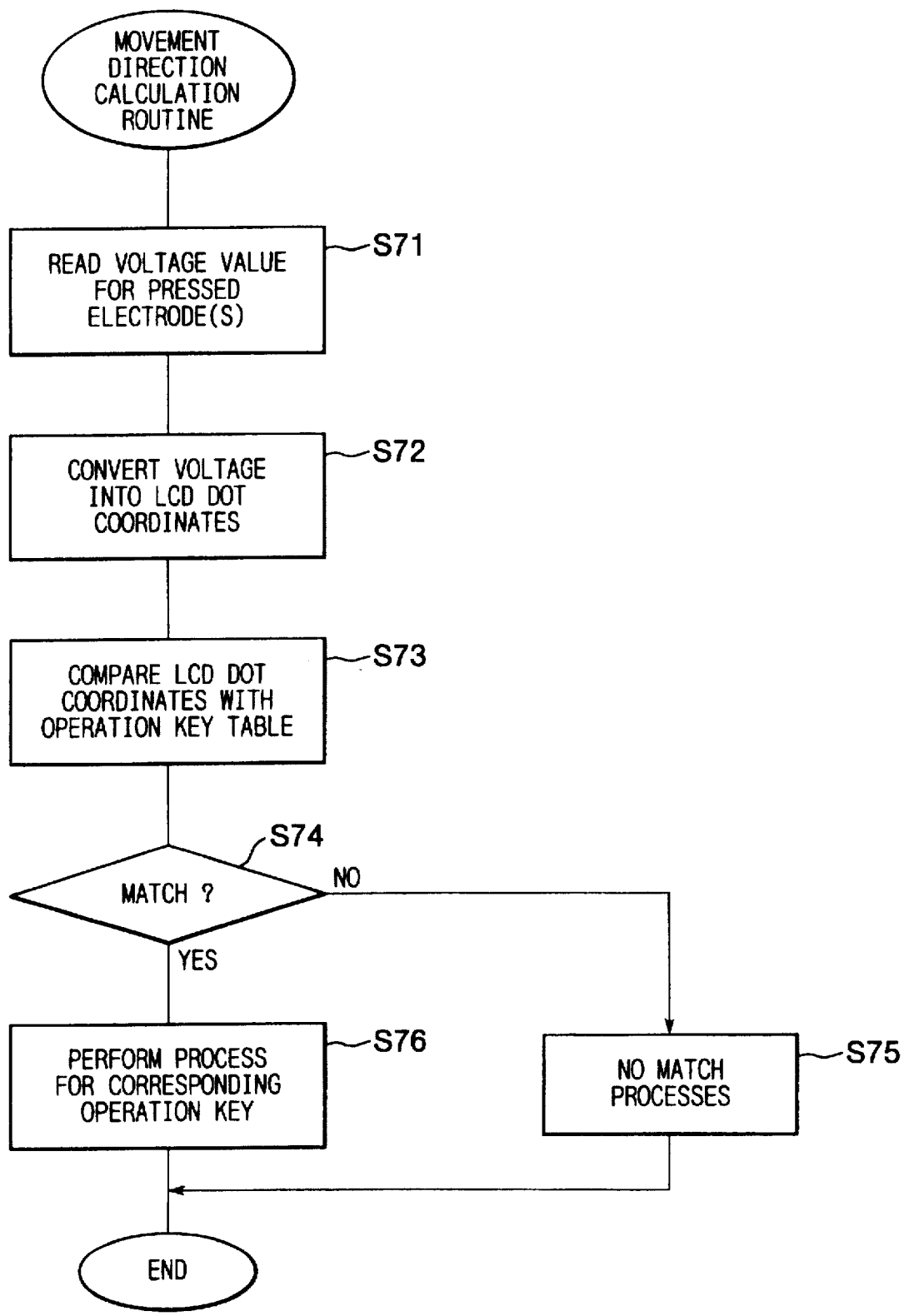
FIG. 15 is a flowchart representing a movement direction calculation routine performed by a control device of the sewing machine.

The calculations for moving the selected pattern as performed in S7 will be explained while referring to the flowchart in FIG. 15. First, the voltage resulting from contact at the pressed electrodes is read in S71. Then the voltage is converted into LCD dot coordinates in S72. Next, the LCD dot coordinates are compared to an operation key table that is stored in the ROM 27 and that lists operation keys displayed on the display in correspondence with dot coordinates of the LCD 23. Whether or not there is a match between the coordinates determined in S72 and coordinates listed in the operation key table is determined in S74. If no match is present (S74:NO), then in S75 processes are performed as if no operation key was pressed and the program returns to S9 of the flowchart in FIG. 13. If there is a match (S74:YES), then processes for the corresponding operation key are performed in S74 and the program returns to S9 of the flowchart in FIG. 13.

In other words, the resistance value at each electrode is generated in an analog form in the analog type touch panel, depending on the pressed position. Detection is not regional in the manner of a digital type touch panel. When two or more positions are simultaneously pressed in the manner described above, more resistance values will influence the voltage inputted to the CPU 26. Therefore a voltage different from when the plurality of positions were pressed separately will be inputted into the CPU 26. The control device 25 interprets the inputted voltage to mean that a position different from the positions actually pressed was pressed. Therefore, an operation different from operations corresponding to either of the pressed keys is performed. It should be noted that the same processes shown in FIG. 15 are performed when only one key is pressed. However, in this case, the voltage detected will be the voltage corresponding to the pressed operation key.

Next, the control device 25 moves the picture pattern B one unit's distance in the lower leftward direction in S9. In other words, the control device 25 performs a process different from the process selected by the user. In more concrete terms, the control device 25 moves the picture pattern B in the lower leftward diagonal direction and not in the leftward direction or the downward direction inputted by the user. In this way, the third method of moving the embroidery pattern described in the summary section of the present application can be applied to move the pattern. It should be noted that when S74 results in a negative determination, the pattern is not moved in S9.

Next, in order to determine whether the user is still pressing the same operation keys, that is, whether or not the detected voltage has returned to the initial value of before when the touch panel was pressed, is determined in S10. If the voltage has not returned to its initial value (S10:NO), then the program returns to S9. In this way, in S9 and S10 the control device 25 starts moving the picture pattern B in single units of movement when the user starts simultaneously pressing the movement operation keys 60, 62. The picture pattern B will gradually move in the lower leftward direction as shown in FIG. 16 until the user releases the movement operation keys 60, 62, whereupon the detection voltage will return to its initial value (S10:YES) and the program returns to S2A.

Alternatively, when the user presses only one of the eight movement operation keys individually, then the control device 25 will move the picture pattern B in the same direction indicated by the arrow of the pressed movement operation key. In this way, it is also possible for the user to use the first and second methods described in the summary section of the present application in order to move the embroidery pattern.

If while pressing a movement operation key to move the subject embroidery pattern in one direction, the user presses an additional movement operation key, the control device 25 will not detect the additional movement direction and will continue moving the picture pattern B in the direction of the first movement operation key pressed. In this way, once movement of the embroidery pattern is started, processes for detecting movement in another direction will not be performed so that the embroidery pattern can be moved rapidly and accurately.

Although detailed description will be omitted, when processes for selecting embroidery patterns and for editing the position of the embroidery patterns are completed, the user presses the position on the LCD displaying "OK" (S3:YES), whereupon the control device 25 develops final embroidery data based on the selected and edited embroidery patterns. The user then sets the workpiece cloth in the embroidery frame 18 and operates the start/stop switch 21. Embroidery sewing operations are executed based on data relating to the embroidery pattern in the RAM 28, in the external ROM card 23, and the internal ROM 27. An embroidery pattern matching the image displayed in the layout region A is embroidered in the workpiece cloth. The sewing machine described above is capable of a variety of different operations, has greater freedom of operation than conventional sewing machines, and reduces restrictions placed on the user by the configuration of the sewing machine.

Although the embodiment describes position setting operations as being performed on an embroidery pattern directly previously selected, position setting operations can be again performed on embroidery patterns that have already once been positioned.

Although the embodiment describes combining two directions, three or more directions could be combined so that the embroidery pattern is moved according to the result of that combination. Also, the ability of performing the function of an operation key by simultaneously pressing two other operation keys need not be provided to all operation keys, but only to a portion of the operation keys. For example, the device can be designed so that the third method of moving the embroidery pattern is applied only when the leftward direction key and the lower direction operation key are pressed simultaneously to move the embroidery pattern in a lower leftward slanting direction, which is a combination of the two directions of two these keys. However, when the other keys are pressed simultaneously, no operation is performed.

The movement operation keys E are disposed close together in an annular configuration in the present embodiment. Therefore, only a small area is encompassed in the center of the eight directional movement operation keys E. However, because the analog touch panel is used as the pressure detecting unit, another operation key, that is, a center key, can be displayed in the center of eight directional movement operation keys E.

Figure 17:
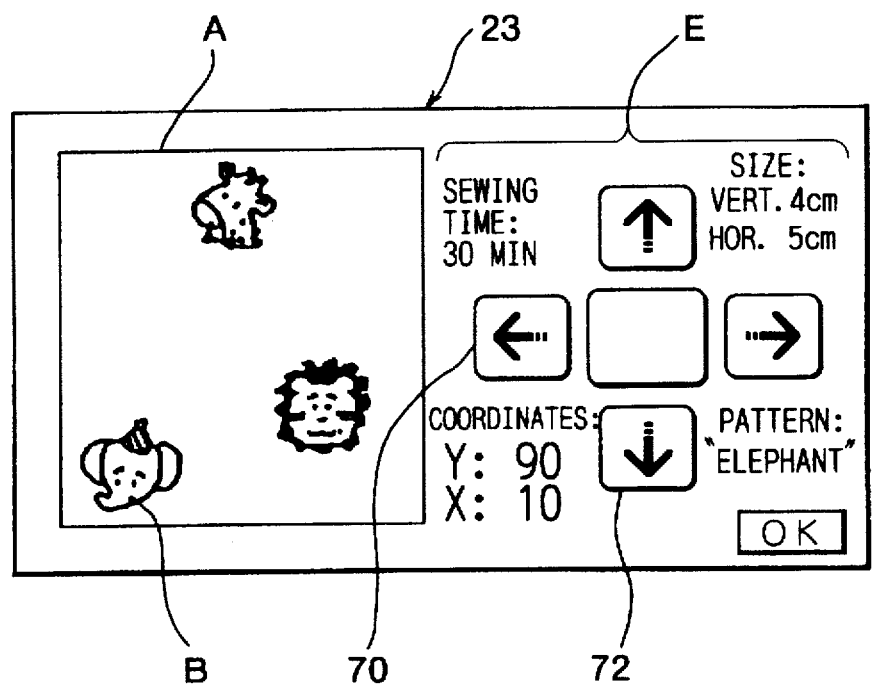
FIG. 17 is a plan view showing a position editing screen according to a first modification of the embodiment.

A first modification of the embodiment will be described while referring to FIG. 17. FIG. 17 shows a position editing screen for enabling a user to move an embroidery pattern in the same manner described in the above embodiment. However, in the modification shown in FIG. 17, a minimum number of movement operation keys, that is, only four keys for moving the embroidery pattern upward, downward, leftward, and rightward, are displayed in a radial pattern. In areas between the lateral and vertical movement operation keys, that is, at positions where diagonal movement keys are shown as displayed in FIGS. 14 and 16, information is displayed on the embroidery image presently being edited. In this example, the image presently being edited (i.e., the elephant picture pattern B), the present coordinate values (i.e., 10, 90) where the picture pattern B is located in the layout region A, the time (i.e., 30 min.) required to sew the picture pattern B, and the size (i.e., vertical 4 cm, horizontal 5 cm) of the picture pattern B are displayed in the regions between the horizontal and vertical movement operation keys. Because a variety of information on the subject embroidery pattern, the overall positional condition of the patterns, and the movement direction of the subject pattern are displayed near each other on the same screen, positioning can be easily performed while referring to this display. Also, all space on a small screen can be effectively utilized. When the user starts to simultaneously press the leftward movement operation key 70 and downward movement operation key 72, the embroidery pattern will move in the lower leftward direction according to the same processes represented by the flowcharts of FIGS. 13 and 15. Therefore, there is no need to provide separate movement operation keys for moving the embroidery pattern in diagonal directions.

Figure 18:
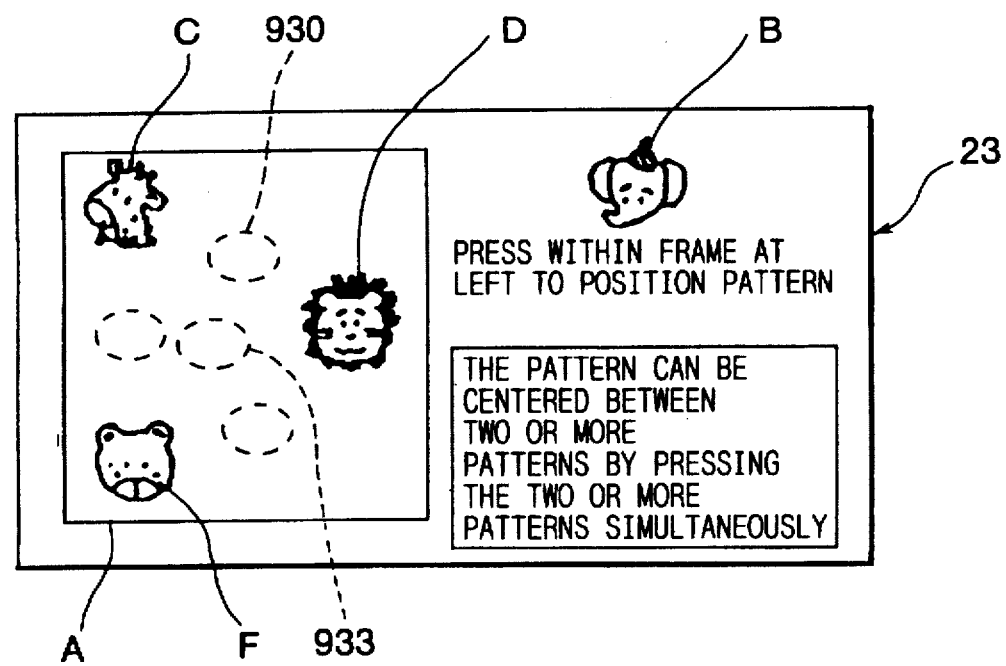
FIG. 18 is a plan view showing a position editing screen according to a second modification of the embodiment.

Next, a second modification of the embodiment will be described while referring to FIG. 18. Picture patterns B, C, D, and F are displayed on the screen as shown in FIG. 18. Again, the picture pattern B is the subject of editing process. In this example, the user presses a desired position in the layout region A to position the picture pattern B at the desired position in the layout region A. The control device 25 will detect this position so that the picture pattern B will appear at that position. Embroidery patterns can be easily positioned on the display corresponding to the embroidery region by directly pressing the screen. The embroidery patterns can be displayed by pressing only one point.

On the other hand, when the user wishes to position the picture pattern B directly between the picture patterns B and C, the user simultaneously presses picture pattern C and D. The control device 25 will perform processes similar to those represented by the flowcharts in FIGS. 13 and 15 and operate as though the region 930, indicated by a broken line at a position between the picture patterns C and D, was pressed. The picture pattern B will therefore appear in the region 930. When the user wishes to dispose the picture pattern B directly between the three picture patterns C, D, and F, the user will simultaneously press the picture patterns C, D, and F. In the same way, the control device 25 will interpret that a region 933 between the picture patterns C, D, and F was pressed so that the picture pattern B will appear in the region 933. It should be noted that the region 933 corresponds to the center of gravity of a triangle formed from apexes at the centers of the patterns C, D, and F.

Next, a third modification of the embodiment will be explained while referring to FIG. 19. It should be noted that the Japanese language includes three types of written characters: katakana, hiragana, and kanji. Hiragana and katakana, referred to collectively as kana, include characters representing the members of the Japanese syllabary, or alphabet. Kanji, or Chinese characters as they are often referred, are ideograms pronounced using one or more of the Japanese syllabary. Katakana, hiragana, kanji, and alphanumeric characters are referred to collectively as characters in this specification.

The members of the Japanese syllabary are divided into 10 groups by pronunciation, for example, an a group and a ha group. The a group includes the five vowel members a, e, i, o, and u. The ha group includes the h-consonant members ha, he, hi, ho, and hu. By adding a double slash to characters of the ha-group, the h-consonant members can be converted into b-consonant members ba, be, bi, bo, and bu. Similarly, by adding a small circle to characters of the ha-group, the h-consonant members can be converted into p-consonant members pa, pe, pi, po, and pu.

FIG. 19 shows a screen a user uses to select members of the ha group. The second line of keys are for selecting the h-consonant characters of the ha group. Keys with the double slash for converting h-consonant members into corresponding b-consonant members are displayed above keys of the h-consonant members. Keys with the small circle for converting h-consonant members into corresponding p-consonant members are displayed below keys of the h-consonant members. When the user wishes to select the pa member of the ha group, the user presses the ha operation key simultaneously with the small circle key disposed therebelow. As a result of the same processes represented in the flowchart shown in FIGS. 13 and 15, the pa member is displayed in the initial position in the center of the layout region A as shown in FIG. 19. In the same manner, the user can select the ba member of the ha group by pressing the ha member key simultaneously with the double slash key disposed thereabove.

Figure 20:
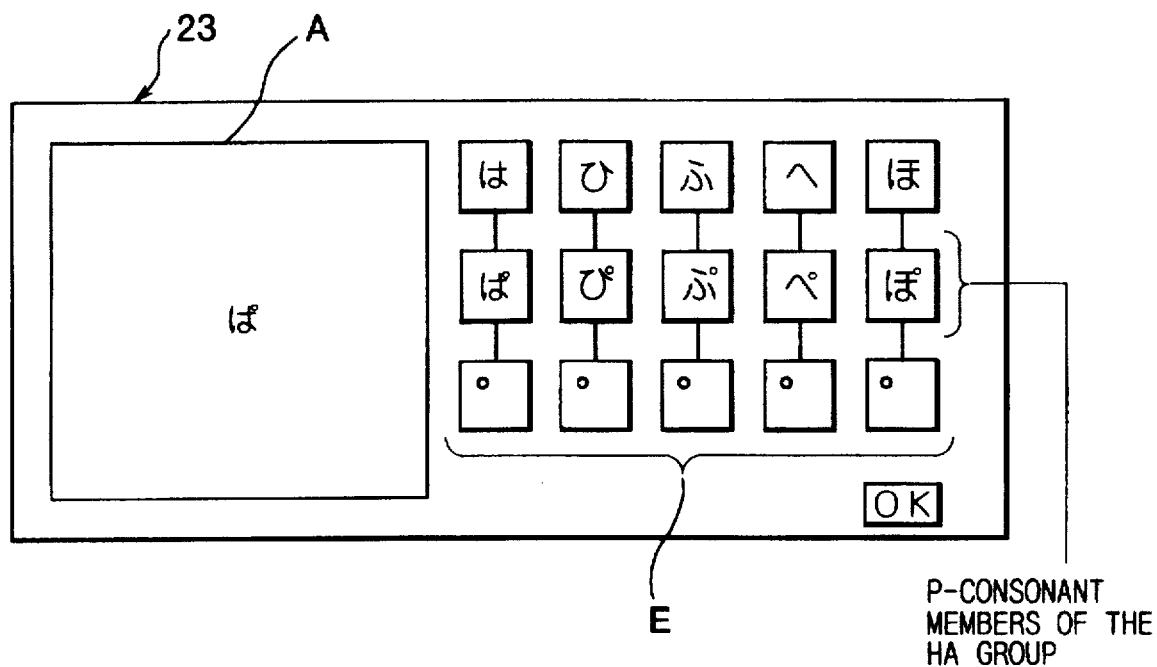
FIG. 20 is a plan view showing a position editing screen according to a fourth modification of the embodiment.

In a fourth modification of the present embodiment, separate screens are provided for the user to directly select either members of the p-consonant members or b-consonant members of the ha group. As shown in FIG. 20, keys indicating the p-consonant members are displayed between keys of the corresponding h-consonant members and keys with the small circle. In this case, the p-consonant members can be selected by the user either pressing the p-consonant member keys directly or by pressing the corresponding h-consonant member key simultaneously with the small circle key. In this way, the user can use a variety of methods to select patterns.

Figure 21:
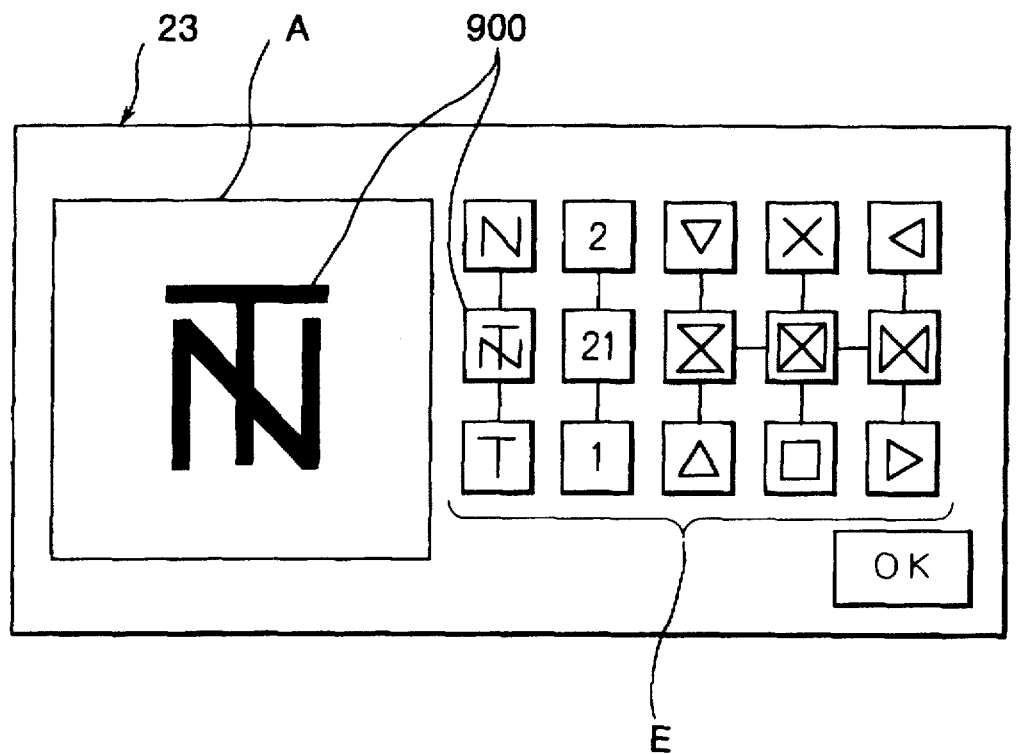
FIG. 21 is a plan view showing a position editing screen according to a fifth modification of the embodiment.
Figure 22:
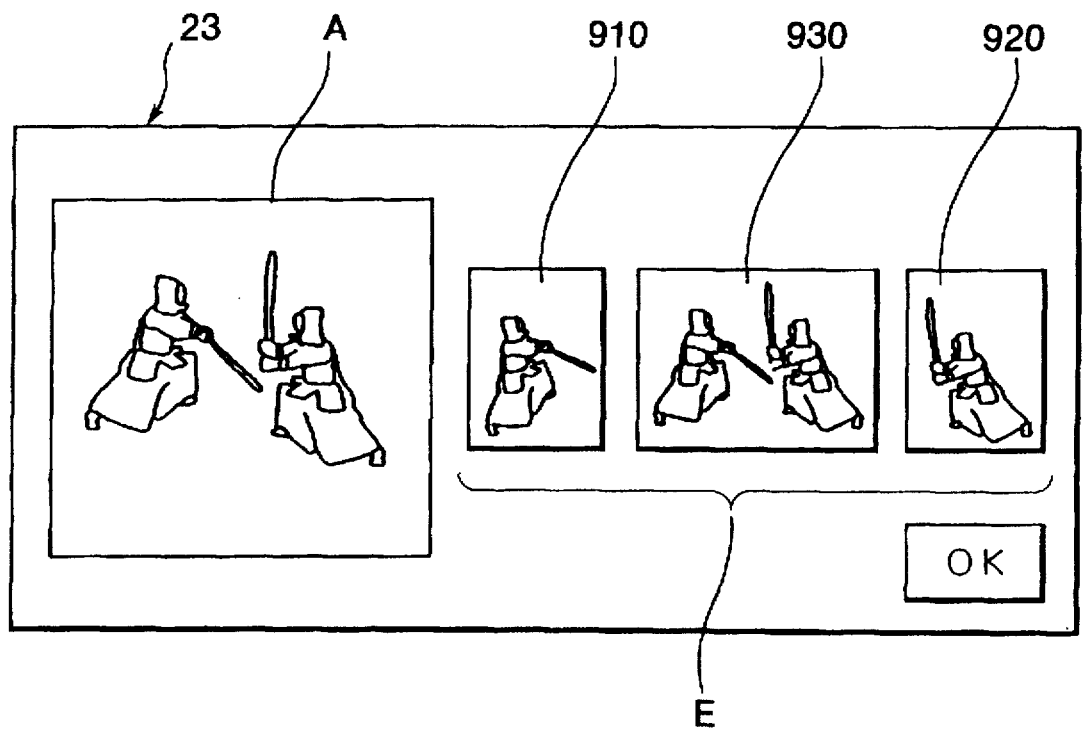
FIG. 22 is a plan view showing a position editing screen according to a sixth modification of the embodiment.

In a fifth modification shown in FIG. 21, when the user simultaneously presses embroidery pattern keys "T" and "N", the embroidery pattern 900, which is different from either of the embroidery patterns selected by the user, is displayed in the initial position at the center of the layout region A. In a sixth modification shown in FIG. 22, a screen of the LCD includes individual embroidery patterns 910 and 920, and a combination embroidery pattern 930, which is a combination of the embroidery patterns 910 and 920. When the user simultaneously presses embroidery pattern keys 910 and 920, the embroidery pattern 930 is displayed in the initial position at the center of layout region A. It should be noted that when either of the individual embroidery patterns 910 and 920 are pressed, the corresponding embroidery pattern will be displayed by itself in the initial position at the center of the layout region A. The processes performed in the fifth and sixth modification shown in FIGS. 21 and 22 respectively are also performed in the manner shown in the flowchart of FIGS. 13 and 15.

In the modifications shown in FIGS. 19 through 22, after a pattern is selected, the control device proceeds to processes for enabling the user to move the selected pattern. In the modifications shown in FIGS. 19 and 20, the combination embroidery patterns are displayed connected by a line so the user can more easily recognize them as a combination of more than one pattern.

While the invention has been described in detail with reference to specific embodiments thereof, it would be apparent to those skilled in the art that various changes and modifications may be made therein without departing from the spirit of the invention, the scope of which is defined by the attached claims.

For example, although the present invention was described applied to a household sewing machine, the present invention could also be applied to an industrial use sewing machine.

The above embodiment and its modifications describe the present invention applied to a sewing machine with an analog type touch panel for specifying a pressed position for each region based on the presence or absence of a signal from contact points. However, a digital type touch panel could be used instead.

The embodiment and its modifications describes specific display positioning of two or more indicated options and of the different options indicated as a result. That is, specific examples where given for when indicating two options aligned on a single line results in an option located at an intermediate position between the two indicated options being indicated. For example, as shown in FIG. 14, when the lower leftward key 64 and its opposite, the upper rightward key, are indicated, the center key 66 is actually indicated. Also, when the sewing patterns C and D shown in FIG. 18 are indicated, the position 930 is indicated. In another example shown in FIG. 18, when more than two options are indicated, that is, the sewing patterns C, D, and F, then an option at the center of gravity between the two or more options, that is, the location 933, is indicated. In another example shown in FIG. 14, when two options, that is, the leftward movement key 60 and the downward movement key 62, are indicated, a different option sandwiched between two indicated categories, that is, the lower leftward movement key 64, is indicated. However, as long as a different option is predetermined for more than one option, the display position of the different input content can be arranged as desired.

Further, the different input option corresponding to the plurality of input options need not be displayed. For example, although FIG. 21 shows the combination pattern 900 displayed between its component patterns N and T, the combination pattern 900 need not be displayed on the same selection screen as the component patterns N and T.

Also, the above-described embodiment and its modifications describe the present invention applied for moving and selecting embroidery patterns. However, the present invention could be applied for selecting and moving practical patterns, such as zigzag stitch and overcastting stitch. Also the sewing patterns to which the present invention is applied can be button holes or other types of patterns other than embroidery patterns and practical patterns. Button holes are formed by combining different sewing methods. For example, a substantially rectangular button hole is formed by sewing two long and two short segments using a narrow zigzag stitch. When many choices are available for each of a plurality of types of sewing methods, the device can be configured so that each portion can be optionally combined when simultaneously selected. For example, the present invention can be applied to the case when a single sewing pattern is prepared by combining a plurality of portion patterns. One example would be preparing composite images of faces by combining hair styles, noses, eyes, and mouths. Although the selected patterns are selected by images in the above-described embodiments, the selected patterns can be displayed using descriptive text instead.

Although both an internal ROM and an external ROM card were used as a memory medium of the sewing machine in the above-described embodiments, only an internal ROM need be provided. Alternatively, a RAM, a magnetic disk, an optical disk, or any other type of rewritable memory medium could be used as the memory medium. Also, the display need not to be a LCD, but could be a CRT display instead.

What is claimed is:

1. A sewing pattern display device comprising:
   a display device for displaying a plurality of options relating to sewing;
   a transparent touch panel disposed adjacent to the display for detecting positions where the touch panel is pressed; and
   a control device for determining, based on detection by the touch panel, a position of the display corresponding to a pressed position of the touch panel and, when the touch panel is pressed at more than one position to simultaneously indicate more than one of the options, processing an option different from the indicated options.

2. A sewing pattern display device as claimed in claim 1, wherein the display includes:
   a pattern display region for displaying at least one of a plurality of sewing patterns: and
   a direction region for displaying a plurality of movement operation keys corresponding to directions to move a subject sewing pattern of the plurality of sewing patterns across the pattern display region; and
   wherein the control device, when the touch panel is pressed to indicate more than one of the plurality of movement operation keys, performs processes to move the subject sewing pattern in a different direction different from directions corresponding to the indicated movement operation keys.

3. A sewing pattern display device as claimed in claim 2, wherein the plurality of movement operation keys includes eight keys arranged in a radial configuration in the direction region.

4. A sewing pattern display device as claimed in claim 3, wherein when the touch panel is pressed to indicate another of the plurality of movement keys while being pressed to indicate the more than one of the plurality of movement keys, the control means continues to perform processes to move the subject sewing pattern in the different direction.

5. A sewing pattern display device as claimed in claim 3, wherein:
   the plurality of movement keys includes a first movement key for indicating to move the subject pattern in a first direction and a second movement key for indicating to move the subject pattern in a second direction opposite from the first direction; and
   the control device, when the touch panel is pressed to simultaneously indicate the first movement key and the second movement key, performs processes to move the subject sewing pattern to a central position in the pattern display region.

6. A sewing pattern display device as claimed in claim 2, wherein the different direction is a direction intermediate between directions corresponding to the indicated movement operation keys.

7. A sewing pattern display device as claimed in claim 2, wherein the plurality of movement operation keys consists of four keys arranged in a radial configuration in the direction region.

8. A sewing pattern display device as claimed in claim 7, wherein the different direction is a direction intermediate between directions corresponding to the indicated movement operation keys.

9. A sewing pattern display device as claimed in claim 7, wherein the direction region further displays information relating to the subject sewing pattern in areas between adjacent ones of the four keys.

10. A sewing pattern display device as claimed in claim 2, wherein when the touch panel is pressed to indicate another of the plurality of movement keys while being pressed to indicate the more than one of the plurality of movement keys, the control means continues to perform processes to move the subject sewing pattern in the different direction.

11. A sewing pattern display device as claimed in claim 2, wherein:
   the plurality of movement keys includes a first movement key for indicating to move the subject pattern in a first direction and a second movement key for indicating to move the subject pattern in a second direction opposite from the first direction; and
   the control device, when the touch panel is pressed to simultaneously indicate the first movement key and the second movement key, performs processes to move the subject sewing pattern to a central position in the pattern display region.

12. A sewing pattern display device as claimed in claim 1, wherein:
   the display is capable of displaying a sewing region representing a sewable region of the sewing machine and capable of displaying, in the sewing region, at least one sewing pattern of a plurality of sewing patterns to be sewn in the sewable region, the plurality of options including the plurality of sewing patterns; and
   when the touch panel is pressed to simultaneously indicate more than one sewing pattern, the control device displays, in the sewing region, a sewing pattern different from any of the more than one sewing pattern.

13. A sewing machine as claimed in claim 12, wherein when the touch panel is pressed to simultaneously indicate more than one sewing pattern, the control device displays, in the sewing region, a composite sewing pattern composed from the more than one sewing pattern.

14. A sewing pattern display device as claimed in claim 1, wherein the touch panel is a digital touch panel.

15. A sewing pattern display device as claimed in claim 1, wherein the touch panel is an analog type touch panel.

16. A sewing pattern display device as claimed in claim 15, wherein the display displays options based on data from an external memory medium.

17. A sewing pattern display device as claimed in claim 2, wherein the touch panel is an analog type touch panel.

18. A sewing pattern display device as claimed in claim 3, wherein the touch panel is an analog type touch panel.

19. A sewing pattern display device as claimed in claim 7, wherein the touch panel is an analog type touch panel.

20. A sewing pattern display device as claimed in claim 8, wherein the touch panel is an analog type touch panel.

21. A sewing pattern display device as claimed in claim 1, wherein the display includes:
   a pattern display region representing a sewable region sewable by the sewing machine and displaying at least a subject sewing pattern of a plurality of sewing patterns as it will be sewn in the sewable region by the sewing machine; and
   a direction region displaying movement operation keys each for moving the subject sewing pattern in one of eight directions across the pattern display region; and wherein
   when the control device determines that the touch panel is simultaneously pressed at positions corresponding to display of at least two of the movement operation keys, the control device moves the subject sewing pattern in a different direction of the eight directions, the different direction differing from directions corresponding to the indicated movement operation keys.

22. A sewing machine as claimed in claim 21, wherein the pattern display region indicates the position of the subject sewing pattern in the sewing region by displaying shapes representing the selected pattern and the sewing region.

23. A sewing machine as claimed in claim 21, further comprising a mounting unit capable of detachably mounting an external memory for storing pattern data relating to the plurality of sewing patterns and wherein the display device displays the subject sewing pattern based on pattern data stored in the external memory mounted in the mounting unit.

24. A sewing machine as claimed in claim 21, wherein the movement operation keys are displayed by the display in an annular arrangement.

25. A sewing machine as claimed in claim 24, wherein the display further displays a centering operation key for moving the subject sewing pattern to a center of the pattern display region, the centering operation key being disposed in a center of the movement operation keys.

26. A sewing machine as claimed in claim 1, wherein:
the display is capable of displaying a sewing region representing a sewable region of the sewing machine and capable of displaying, in the sewing region, at least one sewing pattern to be sewn in the sewable region, the plurality of options including positions in the sewing region; and
when the touch panel is pressed to simultaneously indicate more than one of the positions in the sewing region, the control device positions the subject sewing pattern in a position different from any of the more than one positions.

27. A sewing machine as claimed in claim 26, when the touch panel is pressed to simultaneously indicate more than one of the positions in the sewing region, the control device centers the subject sewing pattern between the more than one positions.

28. A sewing machine as claimed in claim 1, wherein the plurality of options displayed by the display include first operation keys in an annular arrangement and a second operation key disposed in a center of the first operation keys.

* * * * *